United States Patent

Leistner et al.

[11] Patent Number: 5,323,531
[45] Date of Patent: Jun. 28, 1994

[54] SELF-PUNCHING TEE-NUT INSERTION MACHINE

[76] Inventors: Walter H. Leistner, 97 Alamosa Drive, Toronto, Ontario; Keith G. Bromley, Brownlee Drive, Bradford, Ontario, both of Canada

[21] Appl. No.: 996,570

[22] Filed: Dec. 24, 1992

[51] Int. Cl.$^5$ .................. B23P 19/00; B23P 19/04
[52] U.S. Cl. ........................ 29/798; 29/282; 227/16
[58] Field of Search ............... 29/798, 809, 282, 432; 227/16

[56] References Cited

U.S. PATENT DOCUMENTS

| | | | |
|---|---|---|---|
| 2,120,711 | 6/1938 | Phillips | 29/432 |
| 2,217,026 | 10/1940 | Nickerson | 29/432 |
| 3,208,135 | 9/1965 | Newbold et al. | 29/432 |
| 4,224,731 | 9/1980 | Lingle | 29/798 |
| 4,610,072 | 9/1986 | Müller | 29/432 |
| 4,821,940 | 8/1989 | Rotherham | 29/809 |
| 4,825,527 | 5/1989 | Ladouceur | 29/432 |

Primary Examiner—P. W. Echols
Assistant Examiner—David P. Bryant

[57] ABSTRACT

Apparatus for inserting Tee-nuts in a solid wooden workpiece, the Tee-nuts having flanges and threaded sleeves of predetermined length, the workpiece having a thickness greater than the sleeve length. The apparatus has an anvil, an anvil die supported on the anvil, a through bore in the anvil die extending along an axis normal to the anvil, and a circular cutting edge. A power operated device is mounted so as to be reciprocable towards and away from the anvil. A moveable die is mounted on the reciprocable device in registration with the anvil die. The movable die includes a stub portion which can be slidingly received in the threaded sleeve of a Tee-nut, and which registers co-axially with the through bore in the anvil die. The anvil die is generally frusto-conical and has two outer surface portions meeting at an obtuse angle.

8 Claims, 4 Drawing Sheets

SELF-PUNCHING TEE-NUT INSERTION MACHINE

FIELD OF THE INVENTION

The invention relates to a Tee-nut insertion machine, operable to insert Tee-nuts in a wooden workpiece, and in which the machine both punches the hole for the Tee-nut and inserts the Tee-nut in a single operation.

BACKGROUND OF THE INVENTION

Tee-nut insertion machines are in wide use for inserting Tee-nuts into a wooden workpiece. Such Tee-nuts usually comprise a sleeve portion which is internally threaded, and a face flange portion, which usually has prongs formed integrally therewith. In most cases the wooden workpiece is first of all predrilled on a drill press, and the wooden workpiece, already drilled, is then brought to the Tee-nut insertion machine. At that machine, each hole must be carefully registered with a Tee-nut insertion rod. The rod then picks up a Tee-nut and forces it into the predrilled hole. The rod at the same time forces the prongs into the workpiece around the hole.

Tee-nut machines, for this purpose, have been known in the past. In many cases the Tee-nuts were located loose in a hopper, and were fed downwardly to the lower end of a rod, which was, in fact, the piston rod of an operating cylinder.

The wooden workpiece was placed below the rod on an anvil, in registration with the Tee-nut. When the cylinder was operated, the hammer or piston rod would drive downwardly picking up the Tee-nut and forcing it into the hole.

In other machines, the cylinder and rod were located below the workpiece, and an anvil was located above the workpiece. In this case, the wooden workpiece was held upwardly against the anvil, with the hole registering with the Tee-nut which was located beneath it.

Operation of the cylinder would then pick up the Tee-nut and drive the Tee-nut upwardly into the workpiece.

Substantial improvements on these two types of machines are disclosed in U.S. Pat. No. 5,214,843, granted Jun. 1, 1993 inventors Walter H. Leistner and Keith G. Bromley, title "Fastener Setting Apparatus and Method and Fastener Strip Therefor", assignee Sigma Tool & Machine.

In that application, there is disclosed an arrangement of Tee-nuts, formed together into a strip by a flexible connection means. Tee-nuts could then be formed into a large roll. The roll could be placed on a table which was then fed to the insertion rod.

This system did away with the difficulties involved in handling loose Tee-nuts in a hopper, and considerably simplified the machine.

Such strips of Tee-nuts were applicable both to the upward insertion type of machine and also the downward insertion type of machine.

However, even using these improved machines, it was still necessary to predrill all of the Tee-nut holes on a drill press before the Tee-nuts could be inserted by the rod and cylinder.

Clearly, from the viewpoint of speed of operation, it would be desirable if the drilling step were eliminated. In the past, in connection with other types of fastenings, used in relatively thin members such as synthetic plastic panels, it has been the practice to both punch an opening through the thin workpiece and at the same time embed a fastening in the opening. The fastening was almost as long as the thickness of the plastic, and effectively punched out a slug of plastic, as the fastening was driven in. However, it was never thought practical or even possible to apply a self-punching technique to the insertion of Tee-nuts in thicker wooden workpieces. Tee-nuts are usually inserted in relatively thick wooden workpieces such as the frames of beds and furniture, or for example, in panels of shelving or other items of furniture. In some cases the wooden workpieces are both thick and made of softwood, and in other cases the workpieces may be made of hardwood, or chip board, or variations on chip board which are both more dense and stronger than conventional chip board.

In these cases, the workpiece is thicker than the length of the sleeve of the Tee-nut. It is necessary, in this cases, that the hole receiving the Tee-nut shall pass completely through the workpiece. This ensures that any male threaded fastening member which is inserted into the Tee-nut can extend completely through the sleeve, and into the hole in the workpiece, so as to permit the threads to be tightened up. In a typical bed frame or furniture frame, the wooden workpiece may be substantially thicker than the length of the Tee-nut. The Tee-nut sleeve may have a length of about one-half inch, more or less, depending upon the design of the Tee-nut.

It was always thought necessary in this application, that the holes must be pre-drilled. However, pre-drilling of holes, in a factory, on high speed drill presses, did not produce a clear, clean hole. Wood chips were usually left in the hole, and sometimes interfered with the Tee-nuts.

However, if it is attempted to punch a hole simultaneously with the driving of a Tee-nut into a workpiece of this thickness, it is necessary that the operation shall not only punch a hole of sufficient depth to receive the Tee-nut, but shall also punch a hole completely through the workpiece, even though the Tee-nut only reaches perhaps no more than one-half the thickness of the workpiece.

It is also desirable that the self-punching insertion machine shall be adaptable to Tee-nuts of various sizes, having sleeves of various different lengths, and also to workpieces of different thicknesses.

It is also apparent that in order to achieve this type of self-punching operation satisfactorily that the working cylinder must develop very substantial forces on the insertion piston rod. This in turn leads to considerations of the construction of the overall machine, and also safety considerations.

It is also necessary to ensure that in the punching operation, the sleeve of the Tee-nut does not become full of wood chips, since if it does, it may be difficult if not impossible to insert a male threaded member.

Thus the earlier problems relating to pre-drilling leaving wood chips, would not be solved.

The characteristics of the Tee-nuts themselves will also have a considerable influence on the operation of the machine, and all of these factors must be taken into account to produce a satisfactory, reliable machine capable of repetitively punching and simultaneously inserting Tee-nuts into a workpiece.

Still another problem in the design of such a machine is that it must be adaptable to workpieces of different types of woods some of which are softer and some of which are harder. The machine itself must be capable of being so adjusted that it will insert the Tee-nut to the correct depth in the workpiece, regardless of whether the workpiece is hard or soft. Under-insertion of the Tee-nut will be totally unacceptable, since a substantial portion of it will be left outside the workpiece. Over-insertion, for example in a softer workpiece, is equally undesirable, since it tends to damage the workpiece. The construction and design of such a machine must therefore take into account all of these varying conflicting factors, and solve them in a manner which is practical and satisfactory, and workable on the factory floor, as well as in the design laboratory.

BRIEF SUMMARY OF THE INVENTION

With a view to achieving the foregoing advantages described above, the invention comprises apparatus for inserting Tee-nuts in a solid wooden workpiece, each said Tee-nut having a flange portion and a threaded sleeve portion, said sleeve portion defining a predetermined length, and wherein said workpiece defines a thickness greater than said predetermined length, said apparatus comprising an anvil portion defining a working surface, an anvil die supported on said anvil portion, and terminating in a circular cutting edge, a through bore defined by said anvil die, extending from said cutting edge along a die axis normal to said anvil portion, power operated reciprocating means mounted in spaced relation to said anvil portion, and reciprocable towards and away therefrom along an axis normal thereto, and, a moveable die on said reciprocable means, said moveable die being mounted in registration with said anvil die, and being moveable towards and away therefrom along said die axis, said moveable die including a stub portion adapted to be slidingly received in said threaded sleeve of a said Tee-nut, and adapted to register co-axially with said through bore in said anvil die.

The invention further comprises such apparatus wherein said anvil die comprises a base portion, adapted to lie on said anvil portion, and an upstanding generally frusto-conical portion defining a central axis normal to said plane, and said cutting edge being formed at the apex of said frusto-conical portion.

The invention further comprises such apparatus wherein said frusto-conical portion and said base define said through bore, lying on said central die axis, and wherein said through bore defines a first bore portion adjacent said cutting edge, of a first diameter, and a second bore portion spaced from said first bore portion, having a diameter greater than said first bore diameter.

The invention further comprises such apparatus wherein said frusto-conical portion of said anvil die defines a predetermined height, said height being greater than the difference between said thickness of said workpiece, and said length of said sleeve portion of said Tee-nut, whereby when said Tee-nut is fully inserted into said workpiece, the free end of said sleeve portion will extend partially into said first bore of said frusto-conical portion of said anvil die.

The invention further comprises such apparatus including adjustable means for mounting said power operated means, whereby the same may be adjusted along the axis of movement of said moveable die, whereby to precisely adjust the penetration of said sleeve portion of said Tee-nut into said first bore of said frusto-conical portion of said anvil die.

The invention further comprises such apparatus wherein said power operated means comprises a pneumatic cylinder, and a piston operable within said cylinder, and a piston rod extending from said piston through one end of said cylinder, and said moveable die being mounted on the free end of said piston rod, and wherein said piston defines a diameter D and a length L, wherein L is equal to or greater than D, and said piston being formed of solid metallic material, and, buffer means mounted at one end of said cylinder, and opening means formed through said buffer means to permit said piston rod to pass therethrough, said buffer means being operable to stop said piston at a predetermined point, to determine the end of the stroke thereof.

The invention further comprises such apparatus and including feed means for intermittently feeding Tee-nuts to a delivery point, said delivery point being registered with said moveable die, whereby movement of said moveable die will engage a said Tee-nut at said delivery point, for driving into said workpiece.

The invention further comprises such apparatus wherein said frusto-conical portion defines an outer surface having a first profile adjacent said cutting edge, defining a first angle, and a second profile extending from said first profile to said base defining a second angle, said first and second profiles meeting one another at an obtuse angle.

The invention also comprises the method of driving a Tee-nut into a solid wooden workpiece, said Tee-nut having a flange portion and a sleeve portion extending therefrom, said sleeve portion having a predetermined sleeve length, and said workpiece having a predetermined workpiece thickness greater than said sleeve length, and comprising the steps of, positioning a said workpiece on an anvil die, said anvil die having an upstanding frusto-conical portion adapted to penetrate said wooden workpiece, and having a die height less than the thickness of said workpiece, positioning a said Tee-nut on a moveable die, said moveable die having a stub portion adapted to extend through said sleeve portion and having a stub length greater than said sleeve length, driving said moveable die and said Tee-nut against said workpiece on a side thereof opposite to said anvil die, and in registration with said anvil die, along an axis central to said anvil die, continuing movement of said moveable die and said Tee-nut engaged thereby, whereby to force said wooden workpiece down over said anvil die, thereby causing said anvil die to penetrate said wooden workpiece from one side thereof, and substantially simultaneously causing said moveable die and said Tee-nut to penetrate said workpiece from said opposite side thereof, and continuing said movement until said sleeve portion of said Tee-nut partially enters said anvil die, and, limiting movement of said moveable die upon a predetermined penetration having been achieved.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
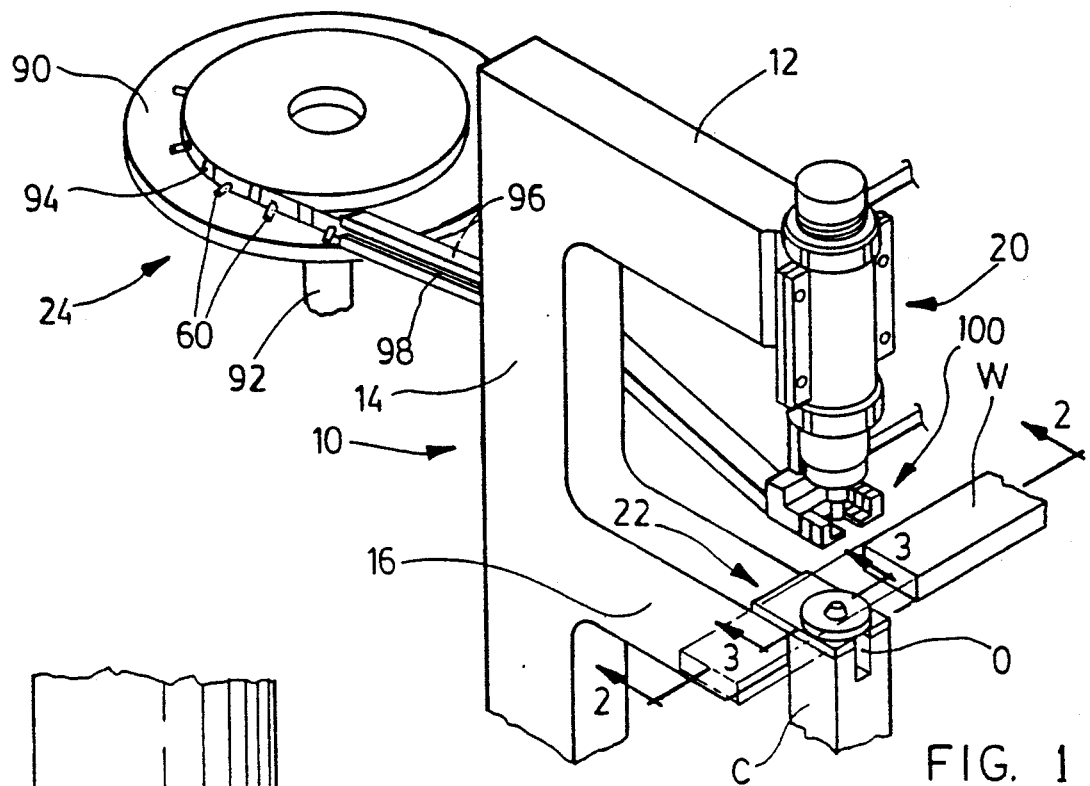
FIG. 1 is a general perspective illustration of a self-punching Tee-nut insertion machine in accordance with one embodiment of the invention.

Referring first of all to FIG. 1, it will be seen that the embodiment of the invention which is illustrated here is in the form of a press indicated generally as 10, having a generally C-shaped frame comprising an upper generally horizontal frame portion 12, a rear generally vertical frame portion 14, and a lower generally horizontal frame portion 16. Typically the press may be incorporated in a production line (not shown) or may be standing on legs, or the like, all of which is well known in the art and requires no specific description.

Presses of this type may be of the downward insertion type, or the upward insertion type. That is to say, in some such presses the Tee-nuts may be inserted from above downwardly into a wooden workpiece, and in other such presses the Tee-nuts may be inserted upwardly, from beneath the wooden workpiece. The present embodiment is shown in the form of a downward insertion type of press, but it will be appreciated that this is without limitation, and the invention is equally applicable to either the downward form or upward form of press.

The press 10 may best be considered as three separate sub-assemblies, namely, the power cylinder assembly indicated as 20, the anvil assembly indicated as 22, and the Tee-nut feed assembly indicated as 24.

The purpose of the power cylinder assembly 20 is to provide the power to punch the hole in the workpiece and simultaneously, to drive the Tee-nut into the workpiece.

The anvil assembly 22 supports the workpiece during the punching and insertion operation. The Tee-nut feed assembly 24 serves to support a rolled strip of Tee-nuts, and to supply them one at a time to the power cylinder assembly 20.

THE POWER CYLINDER ASSEMBLY 20

This will be seen to comprise a cylinder 30 (FIG. 4), typically powered by air pressure, for the sake of convenience. The cylinder 30 has upper and lower ends 32 and 34, and suitable hose means H for admitting and venting air.

The cylinder is adjustably secured on the generally horizontal frame portion 12. Vertical adjustment is provided by means of fastening nuts 36—36, adapted to engage brackets 38—38 (FIG. 4) on the upper frame portion 12.

In this way, the precise location of the cylinder is adjustable vertically towards and away from the anvil assembly, for reasons to be described below.

Within the cylinder 30 there is provided a piston 40.

A piston rod 42 is secured in a bore 43, by a bolt 44. The piston rod 42 extends outwardly through an opening 45 at the lower end of cylinder 30, and is thus reciprocable towards and away from the anvil assembly.

Piston 40 has a diameter D adapted to make a good sliding fit within the cylinder 30, and is provided with one or more suitable seals 46. It has a predetermined extended length L, in order to provide the piston itself with extra mass. Preferably, the piston will have a length L which is equal to somewhere between the diameter D and 1.5 D. The piston 40 is of solid metallic construction, so as to optimize its mass for the purposes described below.

In order to provide for a positive stop of the piston 40 and to precisely regulate the point at which it stops its downward stroke, a buffer block 48 is located in the lower end of the cylinder. It is of generally circular shape in plan, and defines a central opening to receive the piston rod, in registration with the bearing sleeve. It has an upper profile 49 which is convexly curved as shown.

The buffer 48 is preferably formed of firm but resilient synthetic material such as polyurethane, which is sufficiently firm to withstand repeated blows from the piston, but yet will not damage or wear the lower surface of the piston.

At the lower free end of the piston rod 42 there is provided an upper, male die 50. The male die (and the anvil die to be described below) are shown in more detail in FIG. 5.

The male die will be seen to comprise a base surface portion 52 machined on the piston rod (or attached thereto), and an elongated stud portion 54 extending integrally from rod 42.

The base surface portion is dimensioned so as to contact the flange portions of a Tee-nut over its entire surface. The stud portion is dimensioned so as to fit within the threaded sleeve portion of a Tee-nut.

Figures 5, 6:
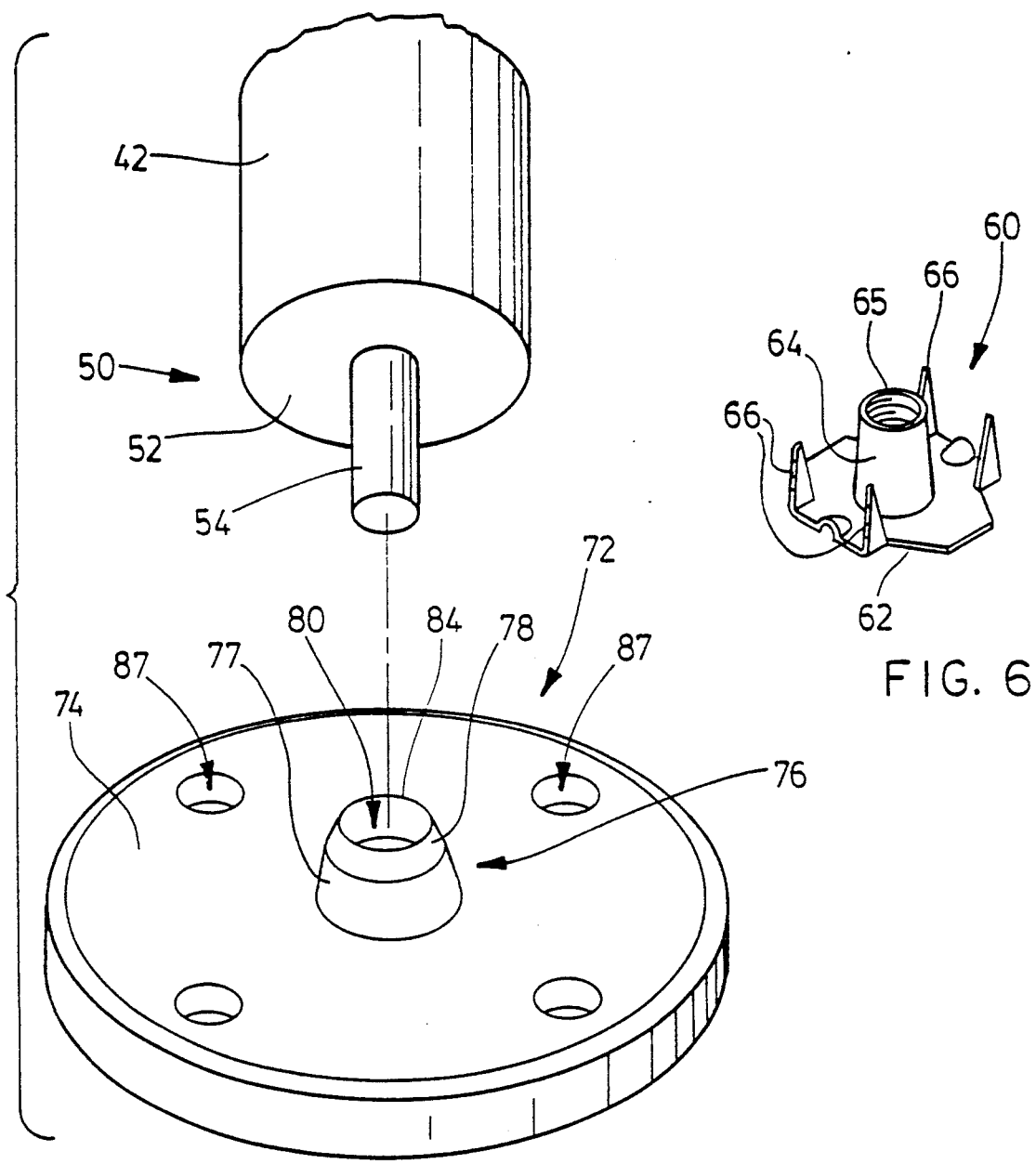
FIG. 5 is an exploded perspective illustration of the male die and the anvil die shown detached from the apparatus.
FIG. 6 is an enlarged perspective of a Tee-nut suitable for use with this embodiment of the invention.

As generally illustrated in FIG. 6, the Tee-nut 60 has a flange portion 62, a sleeve portion 64 and prongs 66.

The free end 65 of sleeve portion 64 defines a squared off profile to act as a self-punch, as described below.

The flange portion will be seen to be fully engaged by the base 52 of the male die. The stud portion of the male die will be seen (FIGS. 2 and 3) to extend through the sleeve portion 64 of the Tee-nut 60, and extend slightly therebeyond outwardly from the free edge 65 of the sleeve portion, for reasons to be described below.

THE ANVIL ASSEMBLY 22

The anvil assembly in this embodiment will be seen to comprise a generally flat planar support plate 70, mounted on the upper surface of the lower horizontal portion 16 of the frame, and positioned at a convenient working height so as to support a wooden workpiece indicated as W, into which Tee-nuts are to be inserted. Plate 70 has a through-bore 71 for reasons to be described. A column C7 may usefully be located below plate 70, and rests on the floor, in some cases.

Located directly under the piston rod and male die, on the plate 70, is the anvil die 72.

The anvil die 72 (FIG. 5) consists of an annular, or rectangular base 74, and an upstanding frusto-conical die sleeve portion 76. The die sleeve portion 76 defines on its exterior a first frusto-conical shaped surface 77, and a second more angled frusto-conical sloped surface 78. Die sleeve 76 defines an interior first bore 80 and an interior second bore 82, aligned co-axially with one another, and extending completely through the frusto-conical die sleeve and also through the base.

The first bore 80 has a tapered interior profile, widening in the downward direction, and the second bore 82 is wider than the wide lower end of the bore 80, and is also tapered, widening in the downward direction, for purposes described. Bore 82 registers with throughbore 71 in plate 70.

The upper extremity of the frusto-conical die portion is formed into a sharp cutting edge 84.

The anvil die is secured on the support plate by any suitable means such as threaded fasteners 86 passing through openings 87 in the base 74 into the support 70.

THE TEE-NUT FEED ASSEMBLY 24

The Tee-nut feed assembly can be one of several different types of feed assemblies such as are known in the art. In this particular embodiment as illustrated, the Tee-nut feed assembly is shown in the form of a rotatable table 90 mounted, for example, on a column 92, and lying in a horizontal plane so that it is free to rotate about a vertical axis.

In this particular embodiment, the Tee-nuts are assembled into a strip of Tee-nuts, by any suitable junction means such as tape 94 secured in this case to the flange portion 62 of each Tee-nut 60. In this way, a certain degree of flexibility is provided between adjacent Tee-nuts. This permits them to be rolled or coiled, as shown at R in FIG. 1, and laid on edge on the table.

A feed guide channel 96 extends from the edge of the table, to a point just beneath and in registration with the piston rod 42 and male die 50. The feed guide assembly defines a feed guide slot having an open side 98. The open side is initially oriented in a more or less horizontal plane, and in this way Tee-nuts on edge in the strip can feed freely into the end of the guide adjacent the table.

The guide defines a gradual twist along its length, through approximately 90 degrees, so that the open side 98 then faces downwardly. Thus when the Tee-nuts reach the piston rod and male die, they are oriented with their sleeves facing downwardly.

At the piston rod end of the guide channel, releasable supports shown generally in FIG. 1 as 100 are provided, which releasably support the endmost Tee-nut directly in registration with the male die. These releasable supports 100 are designed in such a way that they freely release the Tee-nut as it is engaged by the male die. As the piston rod descends, the male die will engage the endmost Tee-nut and will break the tape 94 between the endmost nut and the next adjacent nut in the strip. The endmost nut will then be positioned on the male die, with the stud portion passing through the sleeve of the Tee-nut.

It will, of course, be appreciated that this is a dynamic condition only. That is to say, the Tee-nut will be engaged by the male die in the manner described above, only during the downward acceleration of the piston rod.

It will be observed (FIG. 3) that the stud portion of the male die is slightly longer than the sleeve portion 64 of the Tee-nut. Thus, when the Tee-nut is in position on the male die, the base surface of the male die will engage the upwardly facing flange portion 62 of the Tee-nut, and the stud portion 54 of the male die will project slightly outwardly of the sleeve portion 64 of the Tee-nut.

It will also be appreciated that the feed mechanism incorporates a suitable incremental step-wise feed mechanism (not shown) for feeding the Tee-nut strip along the feed guide in timed relation to the operation of the piston rod. Such feed mechanism is shown in the aforesaid U.S. Pat. No. 5,214,843 and accordingly, its description is omitted in this text for the sake of clarity.

In some cases, the feed mechanism may be operated by air pressure, and may be coupled to the cylinder 20. Thus, when the piston is on its upstroke, the air exhausted from the cylinder may be used to operate the feed mechanism. However, in order to achieve more precise control, a separate electro-air control system (not shown) may be used to advance the Tee-nut strip, and permit adjustment of its operation and Procure the intermittent timed movement of the strip of Tee-nuts in the manner required.

The operation of the cylinder 20 may be controlled in a suitable manner, for example, by means of a foot control or the like such as is well known in the art, and is omitted from the drawings for the sake of clarity.

Figure 2:
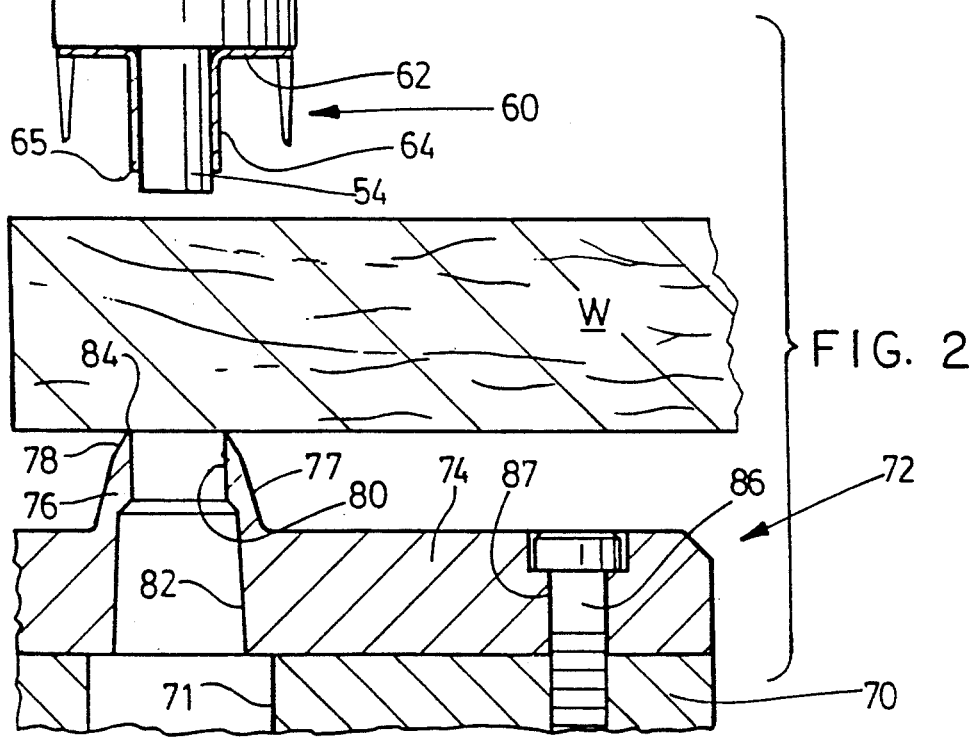
FIG. 2 is a section along the line 2—2 of FIG. 1, showing the male die and anvil dies open.
Figure 3:
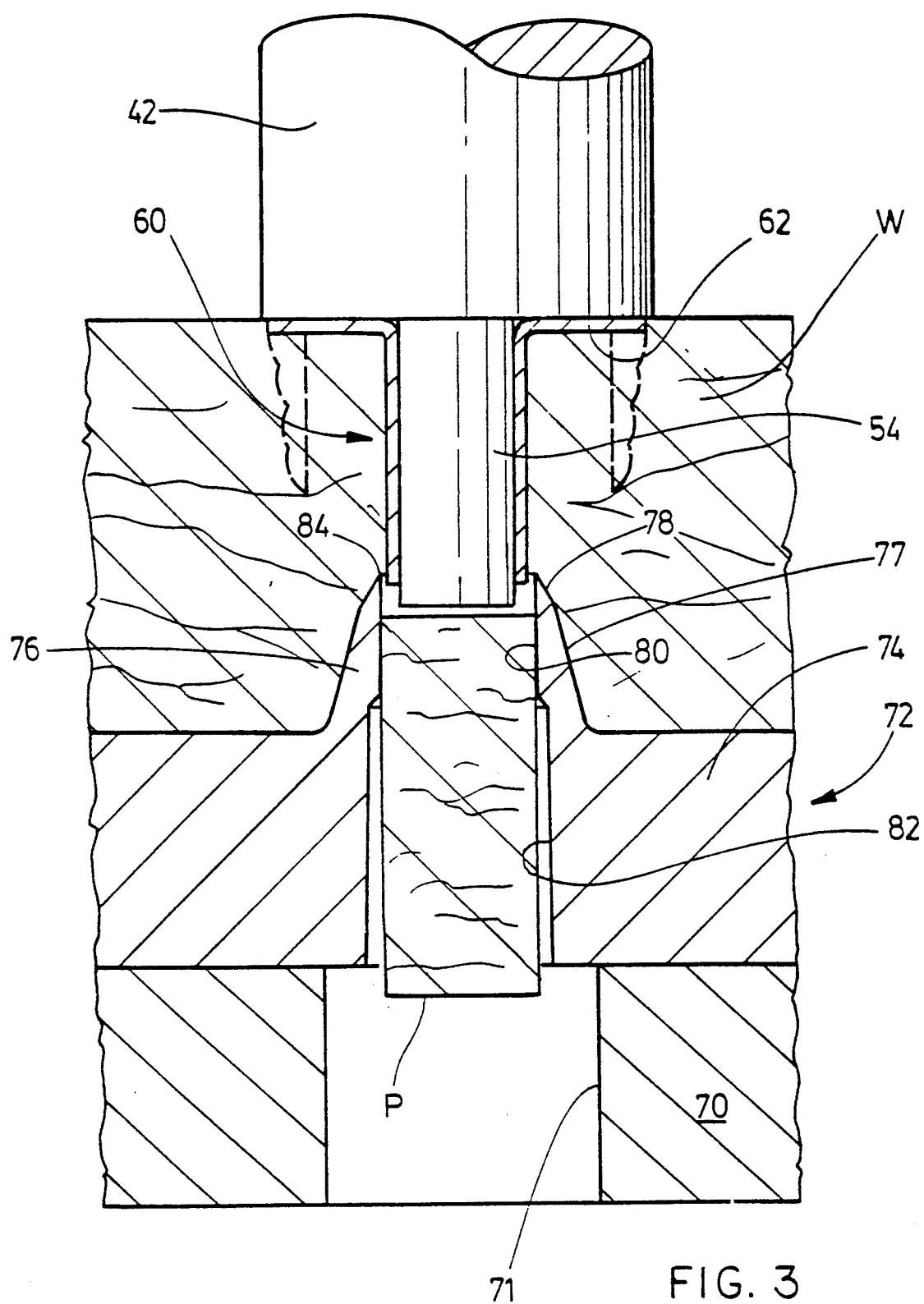
FIG. 3 is a section along the line 3—3 of FIG. 1, with the male die and anvil die shown closed on a wooden workpiece.
Figure 4:
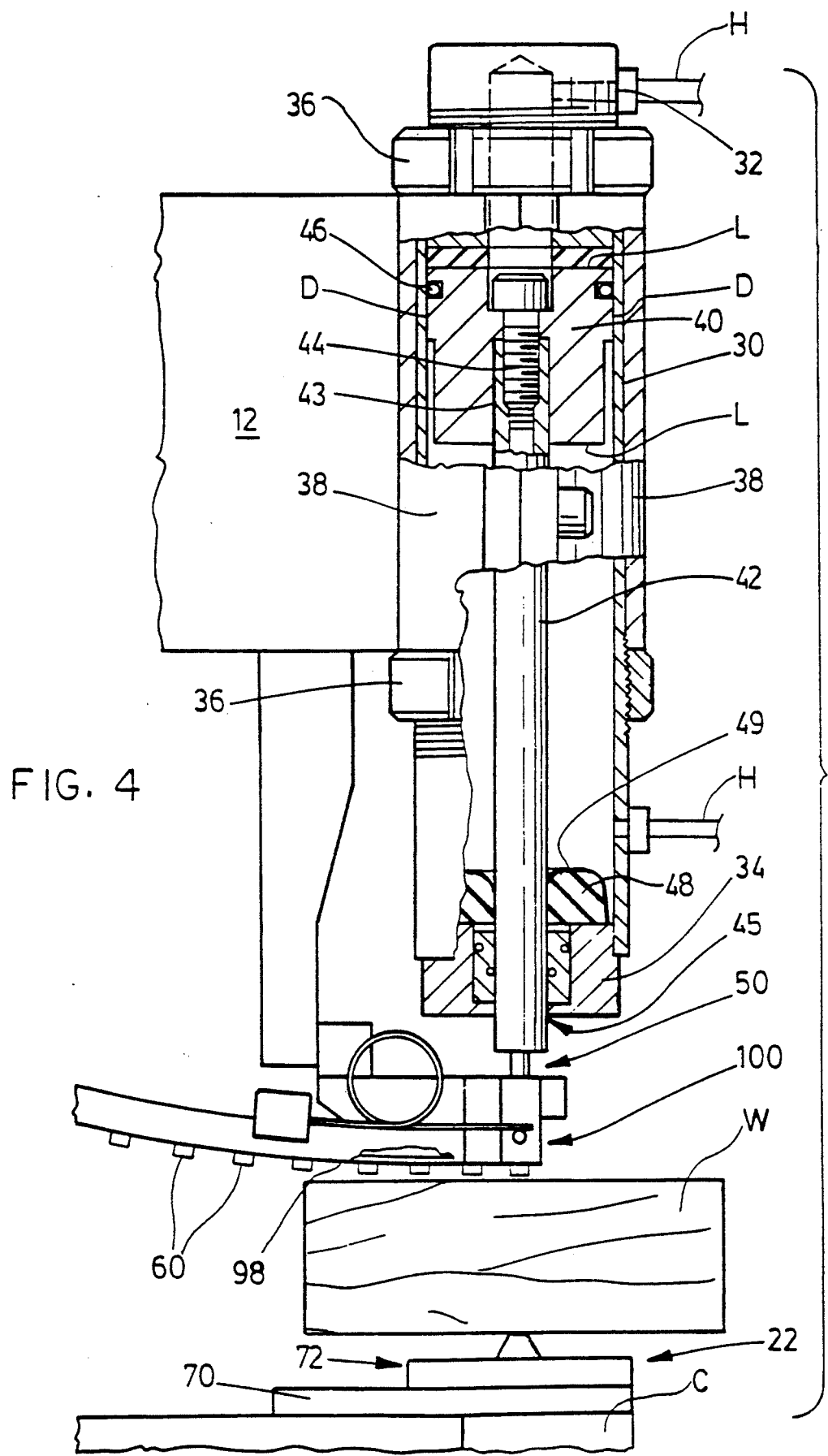
FIG. 4 is side elevation, partly cut away, of the power cylinder and anvil die.

In operation, the relative positions of the male die and the anvil die will be essentially as shown in FIG. 2 and 4. It will be seen that there will be adequate space between the releasable supports 100, at the end of the feed guide channel, holding the endmost Tee-nut, and the cutting edge 84 of the frusto-conical portion 77 of the anvil die, so as to permit a wooden workpiece W to be inserted therebetween. The cylinder will first of all have been carefully adjusted by nuts 36 so as to procure a precise degree of penetration of the Tee-nuts into the anvil die (FIG. 3).

The male die will be located with its stud portion spaced above the flange portion of the Tee-nut, this position defining the upward termination of the stroke of the piston rod. The operator then places a wooden workpiece on the upper end of the frusto-conical portion of the anvil die.

The operator then admits compressed air to the cylinder, typically, for example, by operating a foot pedal (not shown).

The compressed air then drives the cylinder and piston rod and male die downwardly. While the pressure of the compressed air, in many cases may not need to exceed 40 or 50 psi, the piston is of such a mass that it will be accelerated by the compressed air. In this way, the force of the compressed air will be transferred to the piston and piston rod as kinetic energy, at a relatively modest velocity.

This is a particularly desirable feature of the invention for reasons to be described below.

The male die picks up the endmost Tee-nut and separates it from the strip, and the stud enters the Tee-nut sleeve.

As the piston rod continues its downstroke, the tip or lower end of the stud portion 54 of the male die and the end 65 of the sleeve of the Tee-nut impact on the upper surface of the wooden workpiece. The wooden workpiece is thus driven downwardly over the frusto-conical portion of the anvil die. Thus, the anvil die performs an upward piercing function through the lower portion of the wooden workpiece.

As the piston rod, male die and Tee-nut descend further, the stud portion of the male die enters the upper surface of the wooden workpiece, followed by the sleeve portion of the Tee-nut.

The stud member and the Tee-nut thus drive a generally cylindrical plug portion P (FIG. 3) of wood from the wooden workpiece, which passes downwardly inside the frusto-conical portion of the anvil die (FIG. 3), and bore 71 of plate 70.

The free end of the sleeve Portion of the Tee-nut enters into telescopic relation with the top portion of the frusto-conical anvil die. The wooden fibres are thus cut between the sharp edge 84 of the anvil die and the squared off lower end 65 of the Tee-nut sleeve. The wooden plug portion P is thus ejected from within the anvil die, through plate 70.

Where column C is provided it may have an ejection opening O (FIG. 1) for discharge of the plugs P.

At the same time, the driving of the sleeve portion of the Tee-nut into the workpiece will also cause the prongs of the Tee-nut to be driven into the workpiece around the hole punched out by the sleeve portion.

In order to ensure that the Tee-nut is driven into the workpiece to the correct depth, the cylinder is first of all adjustable, by means of the nuts by which it is mounted upwardly and downwardly.

The male die which may in this case is simply be machined on the end of the piston rod, will be matched and sized to the size of Tee-nut and the length of its sleeve portion.

Similarly, the anvil die will also be sized and matched to the length and diameter of the sleeve portion, so that when the Tee-nut is driven into the correct depth, the squared off lower end 65 of the sleeve portion just enters the anvil die (FIG. 3).

The buffer 48 in the cylinder 30 provides a positive stop for the lower limit of the stroke of the piston rod, without causing damage either to the piston or to the interior of the cylinder. The buffer can be replaced if necessary.

In addition, it is found that by operating at relatively low air pressures, and having a relatively large diameter cylinder, and a large diameter piston having a relatively heavy mass, preferably with a length greater than its diameter the force of the relatively low pressure compressed air in the cylinder is sufficient to accelerate the piston to a modest velocity, but since the piston, and also the piston rod, together have a relatively substantial mass, the force of the compressed air is converted into a relatively low speed high mass momentum. This optimizes the operation of the punching and driving in of the Tee-nut in a positive and repeatable precise fashion, without causing damage to the workpiece, or damage to the Tee-nut.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Apparatus for inserting Tee-nuts into a solid wooden workpiece, each said Tee-nut having a flange portion and a threaded sleeve portion, said sleeve portion defining a predetermined length and interior diameter, and wherein said workpiece defines a thickness greater than said predetermined length, said apparatus comprising;
   an anvil portion;
   an anvil die supported on said anvil portion, and defining a base portion, adapted to lie on said anvil portion, and an upstanding generally frusto-conical portion defining a central axis normal to said plane;
   a cutting edge formed at the apex of said frusto-conical portion; and
   said frusto-conical portion defining an outer surface, wherein
   a first profile of said outer surface adjacent said cutting edge defines a first angle;
   a second profile of said outer surface extending from said first profile in said base defines a second angle, and,
   said first and second profiles meeting one another at an obtuse angle;
   a through bore defined by said anvil die, extending from said cutting edge along a die axis normal to said anvil portion;
   power operated reciprocating means mounted in spaced relation to said anvil portion, and reciprocable towards and away therefrom along an axis normal thereto, and,
   a moveable die on said reciprocable means, said moveable die being mounted in registration with said anvil die, and being moveable towards and away therefrom along said die axis, said moveable die including a stub portion having a diameter adapted to make a snug sliding fit in said threaded sleeve of a said Tee-nut, and adapted to register co-axially with said through bore in said anvil die.

2. Apparatus as claimed in claim 1 wherein said frusto-conical portion and said base portion define said through bore, lying on said central die axis, and wherein said through bore defines a first bore portion adjacent said cutting edge, of a first diameter, and a second bore portion spaced from said first bore portion, having a diameter greater than said first bore diameter.

3. Apparatus as claimed in claim 2 wherein said frusto-conical portion of said anvil die defines a predetermined height, said height being greater than the difference between said thickness of said workpiece, and said length of said sleeve portion of said Tee-nut, whereby when said Tee-nut is fully inserted into said workpiece, the free end of said sleeve portion will extend partially into said first bore of said frusto-conical portion of said anvil die.

4. Apparatus as claimed in claim 3 including adjustable means for mounting said power operated means, whereby the same may be adjusted along the axis of movement of said moveable die, whereby to precisely adjust the penetration of said sleeve portion of said Tee-nut into said first bore of said frusto-conical portion of said anvil die.

5. Apparatus as claimed in claim 4 wherein said power operated means comprises a pneumatic cylinder and a piston operable within said cylinder, and a piston rod extending from said piston through one end of said cylinder, and said moveable die being mounted on the free end of said piston rod, and wherein said piston defines a diameter D and a length L, wherein L is equal to or greater than D, and said piston being formed of solid metallic material, and, buffer means mounted at one end of said cylinder, and opening means formed through said buffer means to permit said piston rod to pass therethrough, said buffer means being operable to stop said piston at a predetermined point, to determine the end of the stroke thereof.

6. Apparatus as claimed in claim 1 and including feed means for intermittently feeding Tee-nuts to a delivery point, said delivery point being registered with said moveable die, whereby movement of said moveable die will cause said moveable die to engage a said Tee-nut at said delivery point, for driving said Tee-nut into said workpiece.

7. Apparatus for inserting Tee-nuts into a solid wooden workpiece, each said Tee-nut having a flange portion and a threaded sleeve portion, said sleeve portion defining a predetermined length, and wherein said workpiece defines a thickness greater than said predetermined length, said apparatus comprising;
- an anvil portion;
- an anvil die supported on said anvil portion, and terminating in a circular cutting edge;
- a through bore defined by said anvil die, extending from said cutting edge along a die axis normal to said anvil portion;
- power operated reciprocating means mounted in spaced relation to said anvil portion, and reciprocable towards and away therefrom along an axis normal thereto,
- said power operated means comprising a pneumatic cylinder, and a piston operable within said cylinder, and a piston rod extending from said piston through one end of said cylinder, and said moveable die being mounted on the free end of said piston rod, and wherein said piston defines a diameter D and a length L, wherein L is equal to or greater than D, and said piston being formed of solid metallic material, and, buffer means mounted at one end of said cylinder, and opening means formed through said buffer means to permit said piston rod to pass therethrough, said buffer means being operable to stop said piston at a predetermined point, to determine the end of the stroke thereof, and,
- a moveable die on said reciprocable means, said moveable die being mounted in registration with said anvil die, and being moveable towards and away therefrom along said die axis, said moveable die including a stub portion adapted to be slidingly received in said threaded sleeve of a said Tee-nut, and adapted to register co-axially with said through bore in said anvil die.

8. Apparatus as claimed in claim 7 wherein said frusto-conical portion defines an outer surface having a first profile adjacent said cutting edge, defining a first angle, and a second profile extending from said first profile to said base defining a second angle, said first and second profiles meeting one another at an obtuse angle.

* * * * *